(12) United States Patent
Freter

(10) Patent No.: US 7,878,552 B2
(45) Date of Patent: Feb. 1, 2011

(54) INSERT COUPLING

(75) Inventor: Heiko Freter, Einbeck (DE)

(73) Assignee: A. KAYSER Automotive Systems GmbH, Einbeck (DE)

( * ) Notice: Subject to any disclaimer, the term of this patent is extended or adjusted under 35 U.S.C. 154(b) by 0 days.

(21) Appl. No.: 12/401,695

(22) Filed: Mar. 11, 2009

(65) Prior Publication Data

US 2009/0230673 A1  Sep. 17, 2009

(30) Foreign Application Priority Data

Mar. 11, 2008  (DE) .................. 10 2008 013 565

(51) Int. Cl.
  *F16L 37/00*  (2006.01)
(52) U.S. Cl. ..................... 285/308; 285/319
(58) Field of Classification Search .......... 285/305, 285/309, 310, 319
  See application file for complete search history.

(56) References Cited

U.S. PATENT DOCUMENTS

| | | | |
|---|---|---|---|
| 4,923,228 A | 5/1990 | Laipply | |
| 5,374,088 A | 12/1994 | Moretti | |
| 5,511,827 A | 4/1996 | Steinkamp | |
| 5,568,946 A * | 10/1996 | Jackowski | 285/38 |
| 5,873,610 A * | 2/1999 | Szabo | 285/319 |
| 7,240,926 B2 * | 7/2007 | Dalle et al. | 285/308 |
| 2004/0189001 A1 | 9/2004 | Poder | |
| 2008/0007053 A1 | 1/2008 | Kerlin et al. | |
| 2008/0150280 A1 | 6/2008 | Feger | |
| 2008/0315576 A1 | 12/2008 | Moretti | |

FOREIGN PATENT DOCUMENTS

| | | |
|---|---|---|
| DE | 3727858 A1 | 1/1989 |
| DE | 3929723 A1 | 6/1990 |
| DE | 4300037 C1 | 4/1994 |
| DE | 4413346 C1 | 8/1995 |
| DE | 19722842 A1 | 12/1998 |
| DE | 102004062887 B3 | 10/2005 |
| DE | 102006019257 A1 | 10/2007 |
| EP | 0983462 B2 | 8/2006 |
| EP | 1719944 A3 | 10/2008 |

\* cited by examiner

*Primary Examiner*—Aaron Dunwoody
(74) *Attorney, Agent, or Firm*—Fox Rothschild, LLP

(57) ABSTRACT

An insert coupling more preferably intended for use with fuel lines consists of a sleeve-like coupling body (2) and a tubular insert part (1) carrying a retaining rib (3) on the outside. Via a coupling element (22) axially fixed in the coupling body (2) on to which engagement hooks (4, 4') are molded which are intended for engagement with the retaining rib (3), a ring shoulder (23) is formed at the same time which together with a ring shoulder (24) of the housing (8) of the coupling body (2) axially spaced from said ring shoulder and the radially spaced cylindrical faces of the housing (8) facing each other and the insert part (1) define a ring space (11) in which a sealing arrangement consisting of two sealing rings (5, 7) and a support ring (6) arranged in-between are accommodated. As a result of the unambiguous axial fixing of the sealing arrangement in the housing (8) the function of the sealing arrangement is not impaired through the removal of the insert part (1) from the coupling body (2) and through inserting said insert part in the coupling body (2). A simple construction of the insert coupling is obtained in that said coupling factually consists only of three substantial components plus the sealing arrangement and can be employed with insert parts (1) which are smooth-walled except for a retaining rib (3).

20 Claims, 3 Drawing Sheets

INSERT COUPLING

BACKGROUND

The invention relates to an insert coupling that includes a sleeve-shaped coupling body having a housing, a tubular insert part having a circumferential retaining rib, and a coupling element having a ring shaped body and which can be axially inserted in the housing to be axially fixed in an insert position. The tubular insert part is inserted through the coupling element into the sleeve-shaped coupling body. The coupling element includes at least one engagement hook intended for the positive engagement with the retaining rib of the insert part.

Insert couplings of this type are utilized for example in vehicle construction with fuel lines and serve to establish a connection between a tubular insert part provided with a circumferential retaining rib and a sleeve-type coupling body. The insert part can be manufactured of plastic or metal and be the end of a line or the connection spigot on a housing. The coupling element is usually manufactured of plastic and mounted on a line but can also be a part of a housing.

Insert couplings of this type are characterized by a locking mechanism that is effective between the coupling body and the insert part and are intended to form a sealing connection between the respective line elements to be coupled. They have become known in numerous forms wherein particular attention has been attached to functional reliability and characteristics of assembly-related handling.

From patent document DE 4300037 C1 an insert coupling of the type mentioned above is known wherein the locking mechanism between the coupling body and the insert part is constructed of a component which is displaceable radially to the main axis and intended for engaging behind the retaining rib of the insert part. Comparable insert couplings are known from DE 197 22 842 C2, DE 10 2004 062 887 B3, EP 17 19 944 A2, US 2004/0189001 A1 and DE 10 2006 019 257 A1. With these insert couplings it is disadvantageous that correct engagement of the insert part in the coupling body is not definitely evident from the outside in all cases. The assembly of the insert couplings must take place in two directions so that the expenditure for automatic assembly is clearly increased. The number of necessary components is also high.

A further insert coupling is known for example from DE 44 13 346 C1, whose locking mechanism is realized through a sleeve which is axially inserted in the coupling body and axially displaceable to a limited extent in the slide-in position. The sleeve consists of a ring positioned in the sleeve base of the coupling body from which four webs extend parallel to the axis in even circumferential distribution and in the direction of the open end of the coupling body, of which two carry engagement hooks located diametrically opposite each other intended on the inside to interact with the retaining rib of the insert part. All webs are provided on the radial outside with shoulders which are accommodated axially moveable to a limited extent in recesses of the coupling body so that via two projections molded on the outside to the webs not provided with engagement hooks and protruding from the coupling body the sleeve can be gripped and moved axially relative to the coupling body in order to release the coupled state of the insert part with the coupling body.

A disadvantage with this insert coupling is that correct engagement is not visible from the outside. Furthermore, the sleeve forms an active surface for the seal embodied by means of O-rings. Due to the required axial displaceability of the sleeve, the inserted O-rings, upon introducing the insert part, are pushed into an axial end position and, upon the intended exposure of the coupling to internal pressure, into an opposite axial end position. In the front region, which the O-rings on their path have to cover, dirt is able to enter from the outside. The O-rings perform this displacement with every releasing and establishment of a coupled state so that there is a risk that the O-rings twist and/or dirt particles become embedded in the sealing regions during this movement as a result of which secure tightness is no longer guaranteed. This is all the more significant since this type of coupling among other things is also utilized in fuel lines. A leak test during series production upon the assembly of the coupling as a unit is not possible since the O-rings assume their active position only in the assembled state.

The insert coupling known from DE 39 29 723 is characterized by a sleeve part and an insert part provided with a circumferential retaining rib, wherein the sleeve part is material-connected with a ring-shaped shoulder part carrying an arrangement of reed-like restraining elements orientated from inwardly in the direction of the base of the sleeve part, and wherein in the coupled state these restraining elements are intended for the positive connection engagement behind the retaining rib. The shoulder part on its side axially facing away from the restraining elements forms an active surface for supporting a sealing arrangement, which is otherwise axially supported on the sleeve part. For releasing the coupled state a sliding sleeve is provided whose face end is intended and equipped for the radial engagement below the restraining elements and thus for the releasing of the engagement with the retaining rib of said restraining elements. This insert coupling is thus characterized by a multiplicity of components and thus by a comparatively complicated construction.

Finally a further insert coupling is known from DE 37 27 858 which consists of a sleeve-like coupling body on its one end intended for joining with a hose and an insert part intended for insertion in said hose intended for joining with a line at its end facing away. The end of the coupling body facing the insert part is characterized by a ring element on whose inside block-like locking segments are molded which are intended for the positive engagement behind a holding rib circumferentially arranged on the insert part. The ring element is in connection with the coupling body by way of two webs which extend parallel with the axis and are located diametrically opposite each other, said ring element is further characterized by a cylindrical mounting space on the inside which interacts with two sealing rings each accommodated in slots of the insert part. Releasing of the coupled state is thus possible through the oval deformation of the ring element. This insert part requires utilization of a special insert part which simultaneously acts as carrier of the sealing rings. A special assembly sequence is thus required. Although there are recesses between the mentioned webs—whether there is a correct state of engagement between the retaining rib and the locking segments is at least through mere inspection not easily detectable with adequate reliability.

SUMMARY OF THE INVENTION

It is the object of the invention to improve an insert coupling of the type named at the outset while maintaining its functionality and simple design structure with regard to its handling during assembly and simple detection of a perfect engaged state. This object is solved with such an insert coupling having a sleeve-shaped coupling body having a housing and an axis therethrough, the housing including a recess formed therein, a tubular insert part having a circumferential retaining rib; and a coupling element having a ring shaped body and which can be axially inserted in the housing to be axially fixed in an insert position and through which the tubular insert part is inserted into the sleeve-shaped coupling body. The coupling element includes at least one engagement hook integrally formed therewith and intended for the positive engagement with the retaining rib of the insert part. The at least one engagement hook has a retaining edge and is radially moveably arranged in a position for establishing a releasable engagement with the retaining rib. The ring shaped body has webs arranged parallel to the axis, and the engagement hooks are integrally formed radially on an inside of said webs. Furthermore, the ring body has straps integrally formed therewith parallel to the axis and which extend in a direction away from the sleeve-shaped coupling body and which are spaced from the webs via slots. Face ends are provided on the straps. A ring shaped space is formed between the insert part and the housing of the coupling body when the coupling element is in the insert position in the housing, the ring space being limited by a first ring shoulder formed by an axial face end of the coupling element and a second ring shoulder formed by a radial step of the housing and which second shoulder is spaced from the first ring shoulder when the coupling element is in the insert position. The ring space is further defined by cylindrical surfaces of the housing and the insert part radially spaced from and facing each other. A sealing arrangement is inserted in the ring shaped space, the first and second ring shoulders forming axial active faces of the sealing arrangement. Further provided is a ring shaped element formed by the engagement hooks together with connecting elements and unlocking elements, the engagement hooks being arranged along the circumference of the ring element such that upon radial deformation of the ring element the engagement hooks can be released from its engaged state with the retaining rib, the ring element having a face end facing the face end of the straps and spaced therefrom so as to establish a space therebetween, and that during a coupling state of the insert coupling the retaining rib and the retaining edges of the engagement hooks engaging behind the retainer rib in the recess are visible. An axial width of the retaining rib and said retaining edges corresponds to the spacing so that the intended engagement of the retaining edges of the engagement hooks with the retaining rib of the insert part is visible from the outside.

Accordingly, a coupling element which can be inserted in the coupling body and fixed in its axial position is essential to the invention. This coupling element forms a first axial active surface for a sealing arrangement by way of a ring shoulder. The coupling element also forms the carrier for the engagement hooks which are intended for interacting with the retaining rib. The coupling element is embodied with a view to visual detectability of a correct state of engagement between the coupling body and the insert part. Essential are therefore the establishment of a lateral recess and the positioning of the retaining rib and the engagement hooks with the stipulation that their engagement with the retaining rib within the recess is visually perceptible from the outside. According to the invention, the engagement hooks are attached to a ring element. This opens up simple possibilities of realizing unlocking of the engagement of the engagement hook in the retaining rib in that the ring element is merely deformed radially. Together with a further ring shoulder formed through the housing of the coupling body a ring space is presented in connection with the cylindrical faces of the insert part facing each other and radially spaced from each other and the housing of the coupling body, in that the sealing arrangement is fixed axially non-displaceably and in accordance with elastic deformation is held in a sealing manner in contact with the mentioned faces. The function and the position of the sealing arrangement which can consist of at least one sealing ring is thus not impaired by an insertion of the insert part in the coupling body or through its removal from the coupling body. The insert part can be of a conventional cylindrical type with entirely smooth walls except for the retaining rib. It is evident that the insert coupling is characterized by relatively few components.

In another embodiment the intended engagement of the retaining edges of the engagement hooks with the retaining rib of the insert part can be felt by touch from the outside because of the fact that an outside of the engagement hook extends flush with an adjoining edge of the housing of the coupling body and does not protrude over the housing edge of the housing. These features are directed at a further measure which is intended for the particularly simple verification of a correct state of engagement of the insert part in the coupling body.

The coupling element which functions as a carrier of the engagement hooks as noted above, also exerts a centering function on the insert part via its ring element. This is of major significance to a reliable sealing effect of reproducible quality.

Other features of the invention are directed at a further embodiment of the coupling element, more preferably, the coupling of the coupling element in or to the coupling body. It is particularly advantageous that the fastening state of the coupling element in the coupling body can also be established from the outside through mere inspection.

BRIEF DESCRIPTION OF THE DRAWINGS

The invention is explained in more detail in the following making reference to the enclosed drawings which show preferred exemplary embodiments. It shows.

DETAILED DESCRIPTION

Figure 1:
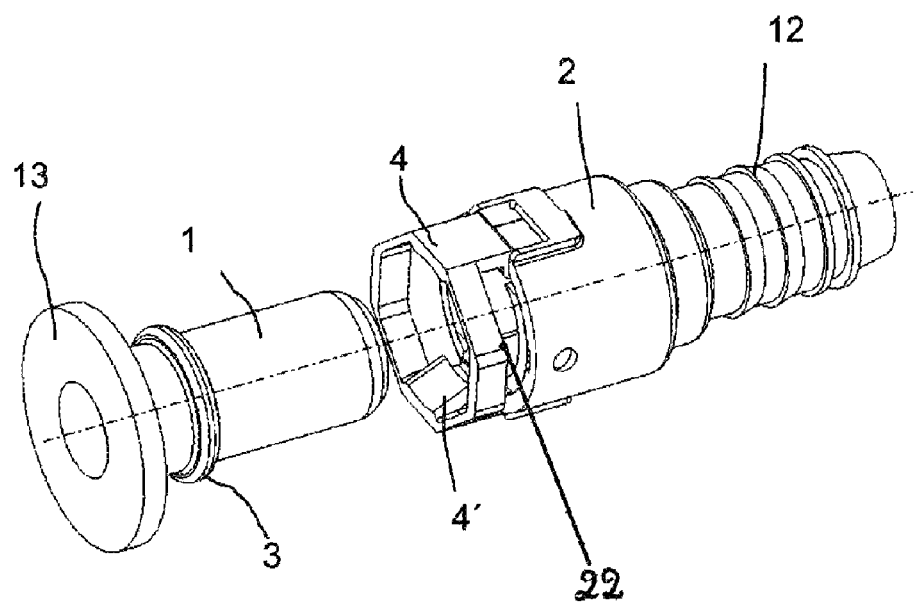
FIG. 1 a partial exploded view of the insert coupling according to the invention.

The insert coupling shown in FIG. 1 generally consists of a tubular insert part 1, a sleeve-like coupling body 2 and a coupling element 22, wherein in the representational form shown the insert part 1 is not yet inserted in the coupling body 2. On the insert part 1 one can see a circumferential retaining rib 3 and, exemplarily arranged as a pair, engagement hooks 4, 4' on the coupling element 22, which engagement hooks are located diametrically opposite each other. Both the coupling body 2 as well as the insert part 1 are provided on their ends facing away from each other with exemplarily shown connections 12, 13 to which a pipe or a hose can be crimped or welded. However, other embodiments are also possible, more preferably these connections 12, 13 can also be direct components of a housing or another component. Except for its dimensioning, the insert part 1 is thus adapted to the coupling body 2 only through the retaining rib 3 and otherwise is smooth-walled on the outside.

Figure 2:
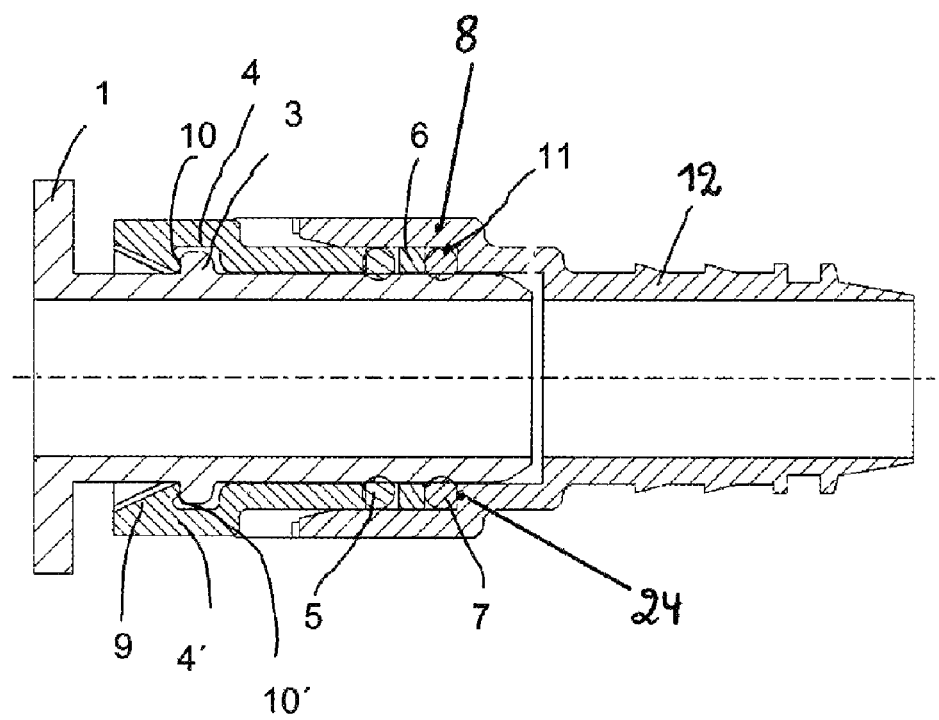
FIG. 2 a longitudinal section of the insert coupling according to FIG. 1 in the engaged state.

FIG. 2 shows the engaged state of the insert coupling. When inserting the insert part 1 in the coupling body 2 its retaining rib 3 strikes an insertion bevel of the engagement hooks 4, 4', as a result of which the latter are elastically deformed outward, so that the spacing of these hooks is increased and the insert part 1 can be further pushed in the direction of the engaged state. As soon as the retaining rib 3 is located behind the respective retaining edges 10, 10' of the engagement hooks 4, 4', these resiliently spring back sufficiently to bear against the smooth-walled outside of the insert part 1. This establishes a positive connection in the axial direction between the insert part 1 and the coupling body 2.

The coupling body 2 is characterized by a tubular housing 8 whose inside diameter is designed to be larger than the outer diameter of the insert part 1, so that between these a ring space 11 is provided in which in axial succession a first sealing ring 5, a support ring 6 and a second sealing ring 7 are accommodated. These rings are axially in contact with one another in the engaged state of the insert coupling, wherein a ring shoulder 24 limiting the ring space 11 on the side of the housing 8 facing the connection 12 and extending radially forms an axial active face for the sealing ring 7.

On inserting the insert part 1 its free end is guided by the sealing ring 5, the support ring 6 and the sealing ring 7 within the ring space 11 of the housing 8. The sealing rings 5, 7 are elastically deformed in the process and are radially tensioned between the cylindrical inner and outer walls of the ring space 11, thus between the sides of the housing 8 facing each other radially and the insert part 1 so that they seal the ring space 11 with respect to the outer space of the coupling body 2. The support ring 6 separates the two sealing rings 5 and 7 in order to obtain separate sealing regions for each sealing ring 5, 7. At the same time, the insert part 1 is centered in the ring space 11 of the housing 8.

The sealing ring 7 and the support ring 6 can be optionally employed when extremely great tightness and redundancy is demanded. Principally speaking, a single ring-shaped sealing element is adequate at that point.

Figure 3:
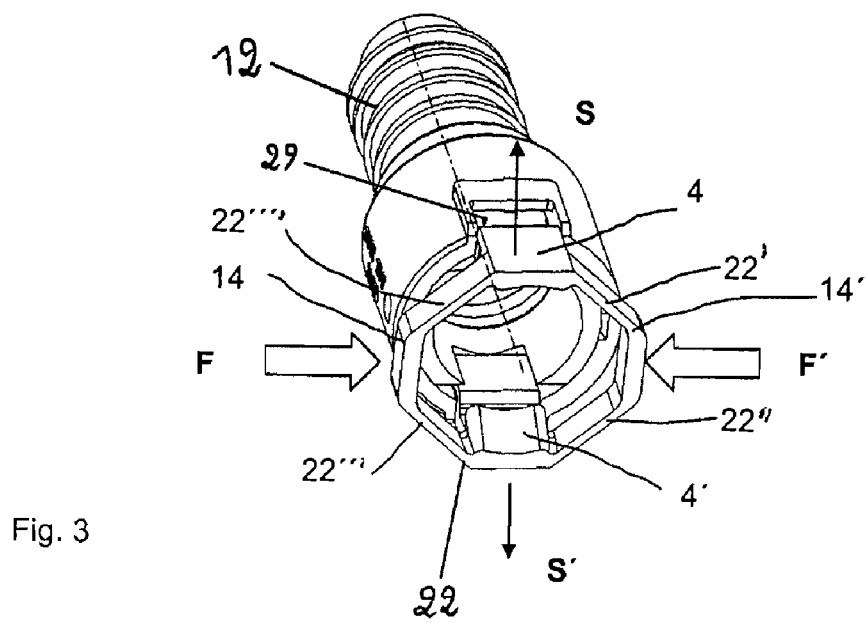
FIG. 3 a perspective front view of the coupling body for explaining the unlocking.
Figure 4:
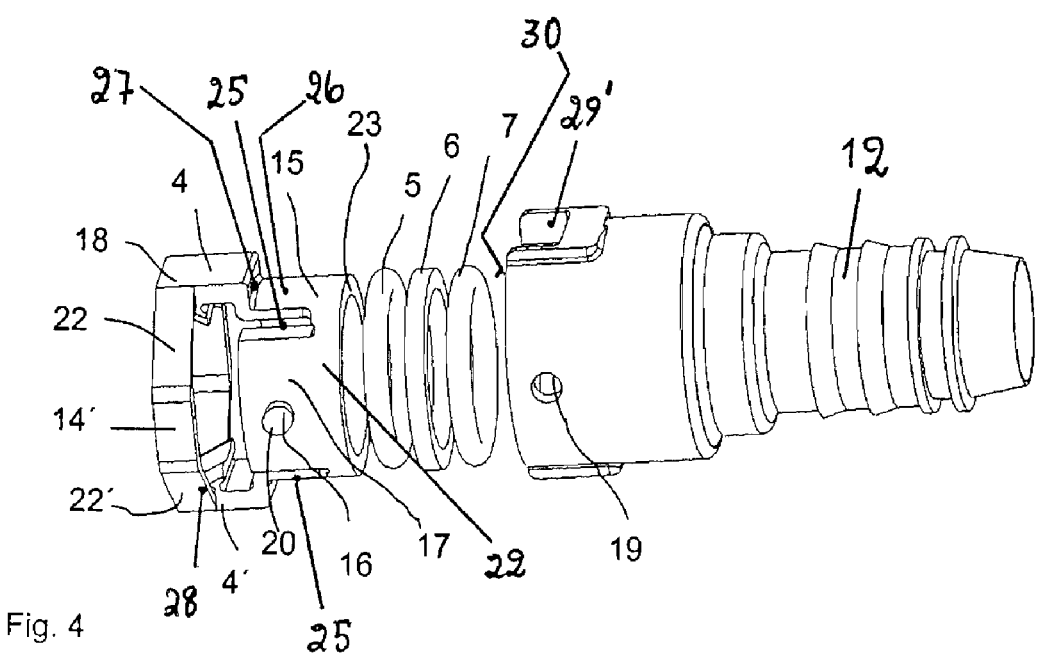
FIG. 4 an exploded representation of the insert coupling according to FIG. 1.

As is evident when viewing FIGS. 3 and 4 together, the coupling element 22 consists of a ring shaped body 15 whose one side facing the connection 12 in the engaged position forms a ring like shoulder 23 which forms an axial active face for the sealing ring 5. The arrangement consisting of the sealing rings 5, 7 and the support ring 6 is thus axially clamped between the active faces represented by the ring shoulders 23, 24 and firmly fixed in its position.

On the ring body 15, specifically on its side axially facing away from the ring shoulder 23, two cylindrical straps 17 extending parallel to the axis and located diametrically opposite each other are molded between which, in each case subject to retaining slots 25, two cylindrical webs 26 likewise located diametrically opposite each other extend, on the free ends of which facing the insert part 1 the mentioned engagement hooks 4, 4' are molded-on radially inside. The webs 26 are otherwise characterized by a step 27 extending in a radial direction from the ring body 15 as seen in FIG. 4 and extending outwardly.

Elastically resilient connection elements are designated 22', 22'', 22''', 22'''', which are molded on to points of the free ends of the webs 26 located radially on the outside and together with these form a polygon-like ring element 28 with lateral segment-like unlocking elements 14, 14' located opposite each other and structured identically. In the installed state of the coupling element 22, which is described below, the radially outside likewise segment-like engagement hooks 4, 4' partially protrude into recesses 29' of the housing 8 which are molded into the face end 30 of said housing 8 facing the coupling element 22.

A possible advantageous unlocking mechanism is shown in FIG. 3. For unlocking, forces are exerted on the unlocking elements 14, 14' in the direction of the arrows F and F'. Via the connecting elements 22', 22'', 22''', 22'''', these forces act on the engagement hooks 4, 4' so as to elastically deform outwardly the engagement hooks 4, 4' in the direction of the arrows S, S' due to the symmetry characteristics of the ring element 28. Because of this movement, the positive connection in the axial direction between the insert part 1 and the coupling body 2 is released. The insert part 1 can now be pulled out of the coupling body 2.

Figure 5:
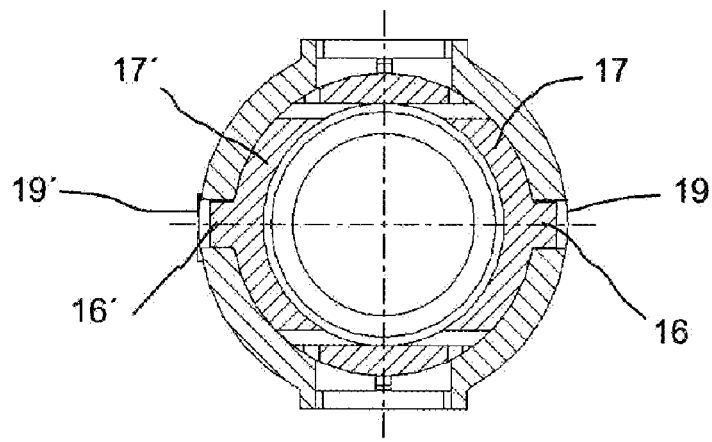
FIG. 5 a cross-sectional representation of the insert coupling according to a section plane V-V of FIG. 6.

FIG. 4 shows all components of the insert coupling in an exploded view. 16, 16' (FIG. 5) designates engagement cylinders (cylindrically shaped engagement pins) which are molded to the outside of the straps 17 in positions located opposite one another extending perpendicularly to a longitudinal axis of the ring element 15.

To assemble the components of the insert coupling, the sealing ring 7 is first inserted in the housing 8, thereafter the support ring 6 and finally the sealing ring 5. As the last component, the coupling element 22 is inserted in the housing 8. Alternatively to this, all of these components can also be mounted on an assembly mandrel which is then jointly inserted in the housing 8. The substantial part is that all of these components can be inserted in the housing 8 in an axial movement.

During this insertion movement, the engagement pins 16, 16' strike the inside of the wall of the housing 8. By way of an insertion bevel 20 provided at its face end, the straps 17, 17' are elastically deformed radially inwardly so that the coupling element 22 can be further inserted in the housing 8. On the further displacement path the engagement pins 16, 16' come into a congruent position with radial bores 19, 19' of the housing 8. The radial bores 19, 19' are openings complimentary to the engagement pins 16, 16' so as to be positioned and configured to receive respective pins 16, 16' therein. Because of the elastic preload of the straps 17, 17' the engagement pins 16, 16' are urged into the bores 19, 19' and form a positive connection, so that the position of the coupling element 22 in the housing 8 is axially secured. Since the bores 19 are openly accessible from the outside of the housing 8, the engaged state of the engagement pins 16, 16' and thus the correct positioning of the coupling element 22 within the coupling body 2 is verifiable through mere external inspection.

In this secured position of the coupling element 22, its ring shoulder 23 forms an active face for the sealing ring 5. At the same time the ring element 15 of the coupling element 22 centers the insert part 1 in the housing 8. Because of the axial and radial fixing of the coupling element 22 in the housing 8, active faces are defined axially on both sides of the arrangement of the rings 5, 6, 7 between which this arrangement is axially secured.

The installation state of the coupling element 22 characterized by an engagement of the two engagement pins 16, 16' in the bores 19 is further characterized in that in the engaged state of the insert coupling the face ends 28' of the ring element 28 and 17' facing each other of the straps 17 are held in accordance with a spacing 31 relative to each other. A retaining edge 10, which is intended as respective integral part of the engagement hooks 4, 4' directly for engaging behind the retaining rib 3 is axially located at a point within the mentioned spacing 31.

Figure 6:
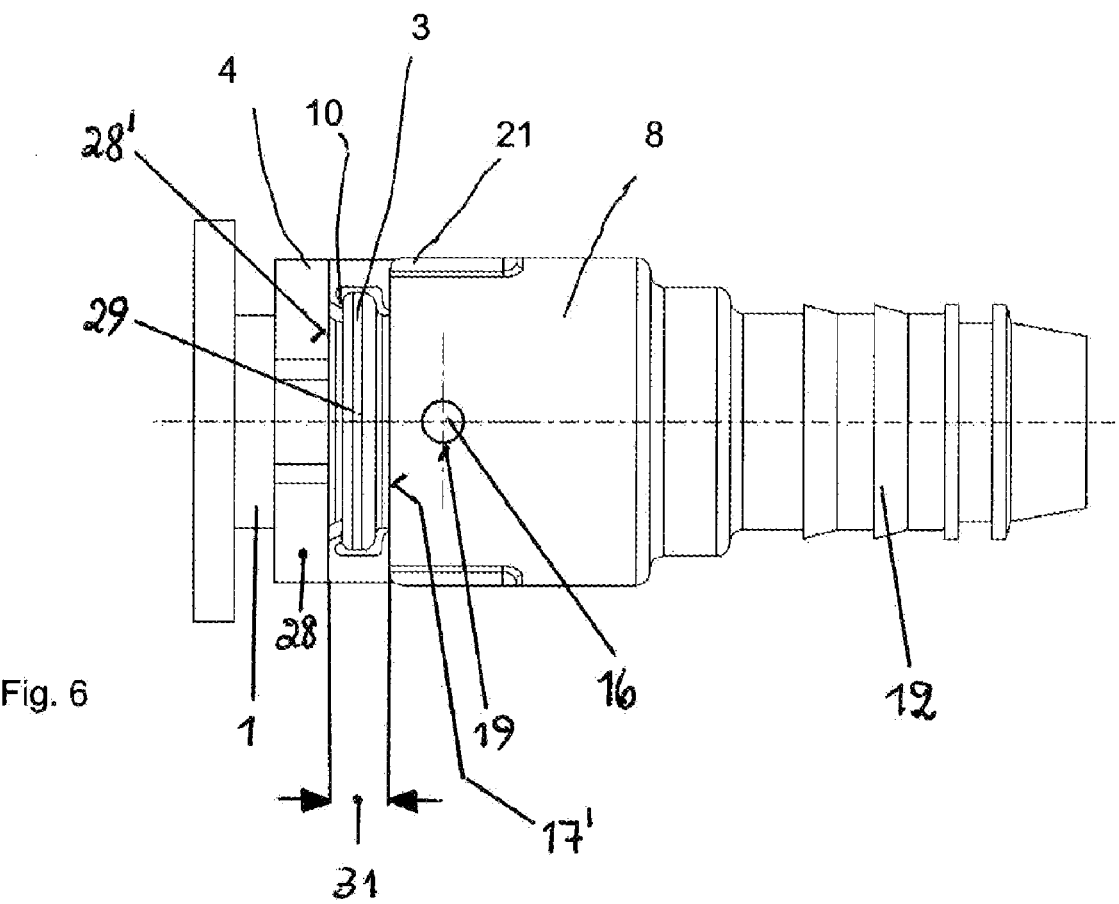
FIG. 6 a lateral view of the insert coupling according to FIG. 1 in the engaged state.

FIG. 6 shows a completely engaged insert coupling according to the invention. The duly engaged position of the retaining edge 10 can be visually seen behind the retaining rib 3 since the axial position of the retaining edge is positioned within the recess 29 defined by the spacing 31.

It is further evident that with a correctly engaged position of the engagement hook 4 its radial outside closes off flush with a housing edge 21 of the housing 8. With incorrect engagement of the engagement hook 4 the retaining edge 10 rests on the outer diameter of the retaining rib 3 so that the engagement hook 4 is radially deformed beyond the housing edge 21, a circumstance that can be detected visually and also through touch.

There are thus two mechanisms of an engagement check which act independently of each other.

What is claimed is:

1. An insert coupling, comprising:
   a sleeve-shaped coupling body having a housing and an axis therethrough, said housing including a recess formed therein;
   a tubular insert part having a circumferential retaining rib;
   a coupling element comprising a ring shaped body and which can be axially inserted in the housing to be axially fixed in an insert position and through which said tubular insert part is inserted into said sleeve-shaped coupling body, said coupling element including at least one engagement hook integrally formed therewith and intended for the positive engagement with said retaining rib of said insert part, said at least one engagement hook having a retaining edge and is radially moveably arranged in a position for establishing a releasable engagement with the retaining rib, said ring shaped body having webs arranged parallel to the axis, said engagement hooks being integrally formed radially on an inside of said webs, said ring body further having straps integrally formed therewith parallel to said axis and which extend in a direction away from the sleeve-shaped coupling body and which are spaced from the webs via slots, said straps having face ends;
   a ring shaped space formed between the insert part and said housing of the coupling body when said coupling element is in said insert position in said housing, said ring shaped space being limited by a first ring shoulder formed by an axial face end of the coupling element and a second ring shoulder formed by a radial step of the housing and which second shoulder is spaced from said first ring shoulder when said coupling element is in said insert position, and wherein the ring shaped space is further defined by cylindrical surfaces of the housing and the insert part radially spaced from and facing each other;
   a sealing arrangement inserted in said ring shaped space, said first and second ring shoulders forming axial active faces of the sealing arrangement;
   a ring shaped element formed by said engagement hooks together with connecting elements and unlocking elements, said engagement hooks being arranged along the circumference of the ring element such that upon radial deformation of the ring element the engagement hooks can be released from its engaged state with the retaining rib, said ring element having a face end facing said face end of said straps and spaced therefrom so as to establish a space therebetween, and that during a coupling state of the insert coupling the retaining rib and the retaining edges of the engagement hooks engaging behind the retainer rib in said recess are visible, an axial width of said retaining rib and said retaining edges corresponds to said space so that the intended engagement of the retaining edges of the engagement hooks with the retaining rib of the insert part is visible from the outside; and
   engagement pins fixedly attached to said coupling element and extending radially therefrom, said housing of said sleeve-shaped coupling body having complimentary openings for receiving said engagement pins when said coupling element is in said insert position within said housing.

2. The insert coupling according to claim 1, wherein the intended engagement of the retaining edges of the engagement hooks with the retaining rib of the insert part can be felt by touch from the outside because of the fact that an outside of the engagement hook extends flush with an adjoining edge of the housing of the coupling body and does not protrude over the housing edge of the housing.

3. The insert coupling according to claim 1 wherein said ring element is configured to center said insert part when said insert part is inserted into said sleeve-shaped coupling body.

4. The insert coupling according to claim 1, wherein a free face end of the ring body constitutes the first ring shoulder.

5. The insert coupling according to claim 1, wherein the coupling element in its inserted position is engaged with the housing.

6. The insert coupling according to claim 1, wherein said engagement pins are cylindrical and extend from said straps.

7. The insert coupling connection according to claim 1, wherein the engagement state of the coupling element with the housing is visible from the outside.

8. The insert coupling according to claim 2, wherein said ring element is configured to center said insert part when said insert part is inserted into said sleeve-shaped coupling body.

9. The insert coupling according to claim 2, characterized in that a free face end of the ring body constitutes the first ring shoulder.

10. The insert coupling according claim 3, characterized in that a free face end of the ring body constitutes the first ring shoulder.

11. The insert coupling according to claim 2, wherein the coupling element in its inserted position is engaged with the housing.

12. The insert coupling according to claim 3, wherein the coupling element in its inserted position is engaged with the housing.

13. The insert coupling according to claim 4, wherein the coupling element in its inserted position is engaged with the housing.

14. The insert coupling according to claim 2, wherein said engagement pins are cylindrical and extend from said straps.

15. The insert coupling according to claim 3, wherein said engagement pins are cylindrical and extend from said straps.

16. The insert coupling according to claim 4, wherein said engagement pins are cylindrical and extend from said straps.

17. The insert coupling after plug connection according to claim 2, wherein the engagement state of the coupling element with the housing is visible from the outside.

18. The insert coupling after plug connection according to claim 3, wherein the engagement state of the coupling element with the housing is visible from the outside.

19. The insert coupling after plug connection according to claim 4, wherein the engagement state of the coupling element with the housing is visible from the outside.

20. An insert coupling comprising:
    a sleeve-shaped coupling body having a housing and a longitudinal axis therethrough, said housing including a recess formed therein;
    a tubular insert part having a circumferential retaining rib;

a coupling element comprising a ring shaped body and which can be axially inserted in the housing to be axially fixed in an insert position and through which said tubular insert part is inserted into said sleeve-shaped coupling body, said coupling element including hooks integrally formed therewith and intended for engagement with said retaining rib of said insert part, said engagement hooks having a retaining edge and are moveably arranged in a position for establishing a releasable positive engagement with the retaining rib, said ring shaped body having webs arranged parallel to the axis, said engagement hooks being integrally formed radially on an inside of said webs, said ring body further having straps integrally formed therewith and which extend in a direction away from the sleeve-shaped coupling body, said straps having face ends;

a ring shaped space formed between the insert part and said housing of the coupling body when said coupling element is in said insert position in said housing;

a sealing arrangement inserted in said ring shaped space;

a ring shaped element at least partially formed by said engagement hooks, said engagement hooks being arranged along the circumference of the ring element such that upon radial deformation of the ring element the engagement hooks can be released from its engaged state with the retaining rib, said ring element having a face end facing said face end of said straps and spaced therefrom so as to establish a space therebetween, and that during a coupling state of the insert coupling the retaining rib and the retaining edges of the engagement hooks engaging behind the retainer rib in said recess are visible, an axial width of said retaining rib and said retaining edges corresponds to said space so that the intended engagement of the retaining edges of the engagement hooks with the retaining rib of the insert part is visible from the outside; and engagement pins fixedly attached to said coupling element and extending radially therefrom, said housing of said sleeve-shaped coupling body having complimentary openings for receiving said engagement pins when said coupling element is in said insert position within said housing.

* * * * *